United States Patent
Badt et al.

(10) Patent No.: US 7,805,305 B2
(45) Date of Patent: Sep. 28, 2010

(54) ENHANCEMENT TO VITERBI SPEECH PROCESSING ALGORITHM FOR HYBRID SPEECH MODELS THAT CONSERVES MEMORY

(75) Inventors: Daniel E. Badt, Atlantis, FL (US); Tomas Beran, Praha (CZ); Radek Hampl, Praha (CZ); Pavel Krbec, Praha (CZ); Jan Sedivy, Praha (CZ)

(73) Assignee: Nuance Communications, Inc., Burlington, MA (US)

( * ) Notice: Subject to any disclaimer, the term of this patent is extended or adjusted under 35 U.S.C. 154(b) by 1021 days.

(21) Appl. No.: 11/548,976

(22) Filed: Oct. 12, 2006

(65) Prior Publication Data

US 2008/0091429 A1 Apr. 17, 2008

(51) Int. Cl.
*G10L 15/18* (2006.01)
(52) U.S. Cl. ............... 704/257; 704/9; 704/270.1; 704/256; 704/242
(58) Field of Classification Search ............ 704/257, 704/270.1, 9, 275, 231, 256, 235, 242, 226
See application file for complete search history.

(56) References Cited

U.S. PATENT DOCUMENTS

| 5,241,619 | A | * | 8/1993 | Schwartz et al. ........... 704/200 |
|---|---|---|---|---|
| 5,267,345 | A | | 11/1993 | Brown et al. |
| 5,293,584 | A | | 3/1994 | Brown et al. |
| 5,425,129 | A | * | 6/1995 | Garman et al. ........... 704/256 |
| 5,677,990 | A | * | 10/1997 | Junqua ........... 704/255 |
| 5,719,997 | A | * | 2/1998 | Brown et al. ........... 704/257 |
| 6,138,099 | A | | 10/2000 | Lewis et al. |
| 6,154,722 | A | * | 11/2000 | Bellegarda ........... 704/257 |
| 6,397,179 | B2 | * | 5/2002 | Crespo et al. ........... 704/242 |
| 6,453,292 | B2 | | 9/2002 | Ramaswamy et al. |
| 2001/0041978 | A1 | * | 11/2001 | Crespo et al. ........... 704/257 |
| 2003/0093272 | A1 | * | 5/2003 | Soufflet et al. ........... 704/231 |

* cited by examiner

*Primary Examiner*—Vijay B Chawan
(74) *Attorney, Agent, or Firm*—Wolf, Greenfield & Sacks, P.C.

(57) ABSTRACT

The present invention discloses a method for semantically processing speech for speech recognition purposes. The method can reduce an amount of memory required for a Viterbi search of an N-gram language model having a value of N greater than two and also having at least one embedded grammar that appears in a multiple contexts to a memory size of approximately a bigram model search space with respect to the embedded grammar. The method also reduces needed CPU requirements. Achieved reductions can be accomplished by representing the embedded grammar as a recursive transition network (RTN), where only one instance of the recursive transition network is used for the contexts. Other than the embedded grammars, a Hidden Markov Model (HMM) strategy can be used for the search space.

18 Claims, 4 Drawing Sheets

ENHANCEMENT TO VITERBI SPEECH PROCESSING ALGORITHM FOR HYBRID SPEECH MODELS THAT CONSERVES MEMORY

BACKGROUND

1. Field of the Invention

The present invention relates to speech recognition and, more particularly, to a speech recognition decoding enhancement that conserves memory and CPU (Central Processing Unit) usage when performing Viterbi based decoding against an N-gram based language model (N>2), where the language model includes embedded grammars.

2. Description of the Related Art

A Statistical Language Model (SLM) is a probabilistic description of the constraints on word order found in a given language. Most current SLMs are based on the N-gram principle, where the probability of the current word is calculated on the basis of the identities of the immediately preceding (N−1)words. Robust speech recognition solutions using a SLM use an N-gram where N is greater than two, meaning trigrams and greater are generally used. A SLM is not manually written, but is trained from a set of examples that models expected speech, where the set of examples can be referred to as a speech corpus. SLMs can produce results for a broad range of input, which can be useful for speech-to-text recognizing words, for free speech dictation and for processing input including unanticipated and extraneous elements, which are common in natural speech. One significant drawback to SLM use is that a size of a speech corpus for generating a SLM can be very large. Another is that SLM based systems are often not sufficiently accurate when confronted with utterances outside of the system's intended coverage.

In many instances, speech recognition grammars are used by speech processing engines instead of, or in addition to, using a SLM. Speech recognition grammars can be used to define what may be spoken and properly speech recognized by a speech recognition engine. Simple speech recognition grammars can specify a set of one or more words, which define valid utterances that can be properly speech recognized. More complex speech recognition grammars can specify a set of rules that are written in a grammar specification language, such as the BNF (Backus-Naur form), a Speech Recognition Grammar Specifications (SRGS) compliant language, a JAVA Speech Grammar Format (JSGF) compliant language, and the like.

Speech recognition grammars can be extremely accurate when provided with expected utterances, which are defined by an associated grammar. Unlike SLM based speech recognition, relatively little data is needed to train speech recognition grammars. Additionally, speech recognition grammars can advantageously include lists and classes that can be dynamically changed. Unfortunately, speech recognition grammars tend to fail completely for unexpected inputs.

Hybrid models attempt to combine the robustness of SLMs with the semantic advantages of speech recognition grammars. A hybrid speech recognition system (conforming to a hybrid model) can use a general SLM that includes one or more encapsulated grammars, referred to herein as embedded grammars (EGs). Decoded speech can contain words from the SLM and sequences of words from the respective EGs along with attached semantics. The usage of EGs can permit the use of less training data for the SLM and can increase recognition accuracy for inputs defined by the EGs.

SLM based speech recognition systems, which include the hybrid systems, typically use a Viterbi algorithm for finding a most likely string of text given an acoustic signal, such as a speech utterance. The Viterbi algorithm operates on a state machine assumption. That is, there are a finite number of states, which are each represented as a node. Multiple sequences of states, called paths, can lead to any given state. The Viterbi algorithm examines all possible paths leading to a state and keeps only the most likely path.

When using EGs in a Viterbi search, a single EG is treated as a single word. This means that each EG has to be repeated for each of the different contexts in which it appears in a Viterbi search. The memory consumption for each EG is significant. Whenever N-grams are used where N is greater than two, a complexity of a Viterbi search space that includes EGs can be huge, due to EG repetition for each context within which the EG is used. Because of a complex search space, Viterbi searches can consume tremendous amounts of memory, which can severely degrade speech recognition performance in terms of CPU utilization. Memory is consumed in such quantities that it can be practically impossible to perform the hybrid Viterbi search using embedded speech recognition systems, which typically have limited resources. Even robust computing systems can become quickly overtasked when a search space includes multiple EGs, each having multiple usage contexts.

SUMMARY OF THE INVENTION

The present invention provides a solution to reduce the complexity of a Viterbi search of an N-gram model having N greater than two that contains embedded grammars to a size of a bigram model search space. Reducing the search space reduces an amount of memory needed and reduces needed CPU requirements. Using the solution, an embedded grammar is only included with a Viterbi search space once, regardless of a number of contexts within which the embedded grammar is used, even though trigram searches or greater are performed. This reduction of the search space is accomplished by representing each embedded grammar as a recursive transition network (RTN).

The present invention can be implemented in accordance with numerous aspects consistent with material presented herein. For example, one aspect of the present invention can include a speech processing method that generates a search space for a speech recognition decoder from an N-gram language model having N greater than two. The language model can include one or more embedded grammars, at least one of which is used in multiple contexts. Within the search space, grammar identifiers can be associated with grammar nodes, which represent embedded grammars. The same grammar identifier can be repetitively used to uniquely refer to an associated embedded grammar. Each grammar identifier can reference a RTN corresponding to the embedded grammar.

When decoding speech based upon the generated search space, a unidirectional decoding algorithm, such as a Viterbi algorithm, can be used for nodes of the search space other than grammar nodes. When a grammar node is encountered, an incoming probability for a path including nodes preceding the grammar node can be determined. An outgoing probability for an extended path that includes the grammar node can be determined using the RTN referenced by the grammar identifier. The method can return to a point in the search space immediately following the grammar node, where the unidirectional decoding algorithm can be used to process subsequent nodes, assuming these nodes are not other grammar nodes. The probability used by the unidirectional decoding algorithm for a next node following the grammar node can be the outgoing probability.

Another aspect of the present invention can include a speech recognition method that comprises a finite state machine (FSM) search space for a speech recognition decoder that is based upon an N-gram language model. The language model can include at least one embedded grammar. Also, the language mode can have a value of N that is greater than two. The finite state machine search space can include statistical language model (SLM) nodes and grammar nodes. Each grammar node can represent a state associated with an embedded grammar. SLM nodes can be processed by a decoding algorithm that uses a Hidden Markov Model (HMM) based strategy. The grammar nodes can be processed by a decoding algorithm that uses a RTN based strategy. In the method, only one instance of each of the embedded grammars is needed regardless of a number of contexts in which each of the embedded grammars is utilized.

Still another aspect of the present invention can include a method for semantically processing search for speech recognition purposes. The method can reduce an amount of memory required for a Viterbi search of an N-gram language model having a value of N greater than two and also having at least one embedded grammar that appears in a multiple context to a memory size of approximately a bigram model search space with respect to the embedded grammar. This reduction can be accomplished by representing the embedded grammar as a RTN, where only one instance of the RTN is used for the contexts.

It should be noted that various aspects of the invention can be implemented as a program for controlling computing equipment to implement functions described herein, or a program for enabling computing equipment to perform processes corresponding to the steps disclosed herein. This program may be provided by storing the program in a magnetic disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

The method detailed herein can also be a method performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
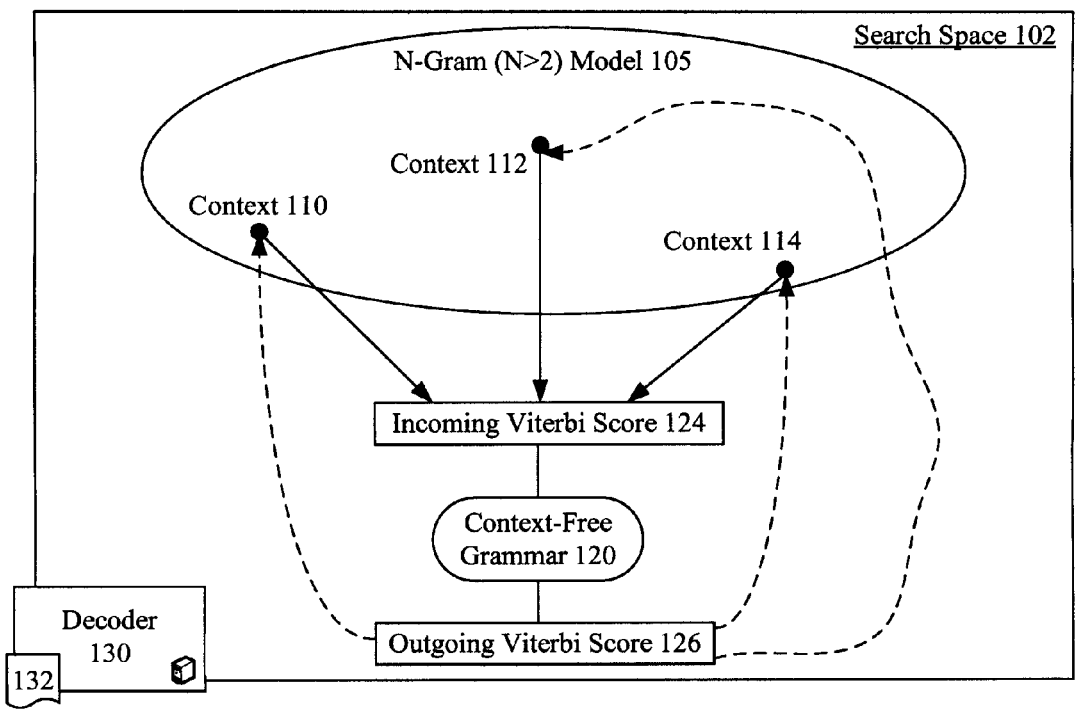
FIG. 1 is a schematic diagram of a system that reduces a search space handled by a speech recognition decoder to efficiently process a language model containing at least one context of a context free grammar.
Figure 1:
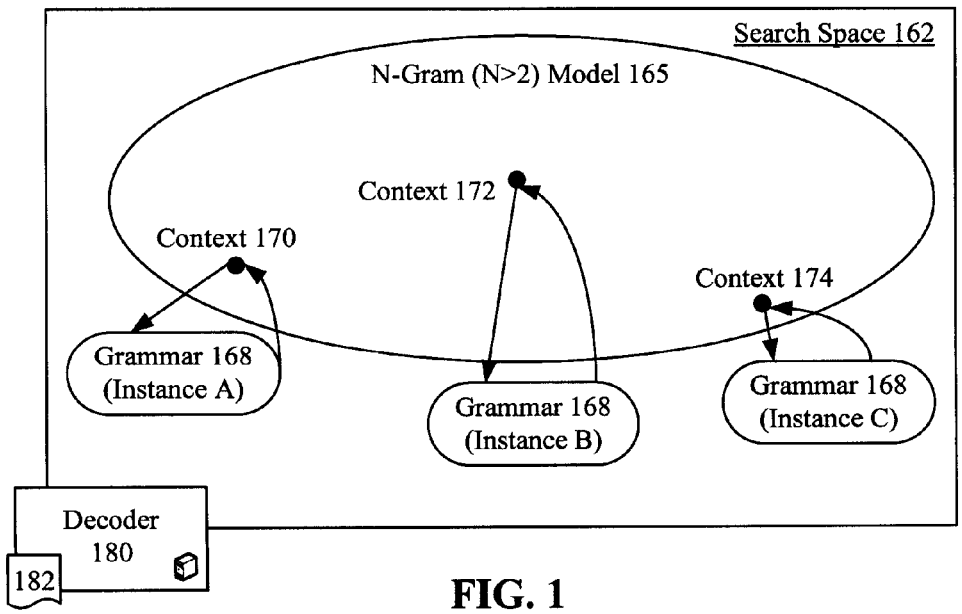

FIG. 1 is a schematic diagram of a system 100 that reduces a search space 102 handled by a speech recognition decoder 130 to efficiently process a language model 105 containing one or more context 110-114 of context free grammar 120. Reducing the search space 102 reduces an amount of memory needed and reduces needed CPU requirements. The task of decoder 130 is to combine the probabilities and rules given by all the model components in space 102 to find a word sequence that best matches with a given speech segment. The decoder 130 can utilize a decoding algorithm 132, which can be based upon the Viterbi algorithm. System 160 is shown for comparison purposes and illustrates a conventionally implemented speech recognition system.

The language model 105 can be an N-gram model where N is greater than two. The context-free grammar 120 can be an encapsulated grammar of language model 105 referred to as an embedded grammar (EG). The language model 105 can have one or more EGs, each being used in multiple contexts 110-114. Each context 110-114 can be considered a grammar node of model 105, where other nodes are referred to as statistical language model (SLM) nodes. A grammar node is processed by the instance of a grammar 120 and then processing can return back to the calling context 110-114. Consequently, regardless of the number of contexts 110-114 of the grammar 120 in language model 105, only one instance of the context-free grammar 120 is needed. This is true even when N is greater than two for the language model 105.

The approach of system 100 can be contrasted with a conventional implementation of EG within hybrid systems, shown by system 160, where decoder 180 utilizes a standard Viterbi algorithm 182 to process search space 162. System 160 also includes an N-Gram language mode 165 that includes three contexts 170-174 of an EG 168. Each context 170-174 requires a separate instantiation (Instance A, B, and C) of the EG 168, assuming that N is greater than two for the language model 165. This can have an explosive effect on memory needed for utilizing language model 165.

In system 100, only one instance of the grammar 120 is needed because of a novel approach implemented in system 100, which associates a sub-network for each embedded grammar. A typical Hidden Markov Model (HMM) strategy is used for handling SLM nodes or states of the finite state machine (FSM) of model 105 other than grammar nodes corresponding to an EG. EG nodes are handled by a separate sub-network, which uses a strategy that considers an entry and an exit state. For example, each EG node can be associated with a grammar 120 specific recursive transition network (RTN).

Probabilities for states of model 105 can be determined by decoder 130 using Viterbi calculations. An incoming Viterbi score 124 can be determined for each context 110-114. The probability for the context free grammar 120 can be determined, which modifies the original score. The modified score can be transmitted as an outgoing Viterbi score 126 back to the calling context 110-114. That is, once calculations are preformed for the sub-network, processing can return to the entry state, which is the calling context 110-114. Accordingly, regardless of a number of contexts 110-114, only one instance of grammar 120 is needed.

This combined solution can be distinguished from the normal Hidden Markov Model (HMM) strategy implemented for language models, such as language model 165. When using a pure HMM strategy, a probability of taking a transition from state i to state j depends on the previous state of i only. That is, a pure HMM strategy is capable of unidirectional processing only, where information concerning a prior state is no longer available after that state has been processed. A pure HMM strategy is incapable of exiting from one state (when an EG is detected) and returning back to that state after some processing occurs. System 160 uses a conventional HMM strategy, which results in a duplication of EG 168 instances for each context 170-174, assuming N is greater than two for the language model 165.

It should be noted that grammar 120 can specify a set of one or more words, which define valid utterances, that can be properly speech recognized. Further, grammar 120 can optionally specify a set of rules that are written in a grammar specification language, such as the BNF (Backus-Naur form), a Speech Recognition Grammar Specification (SRGS) compliant language, a JAVA Speech Grammar Format (JSGF) compliant language, and the like.

Figure 2:
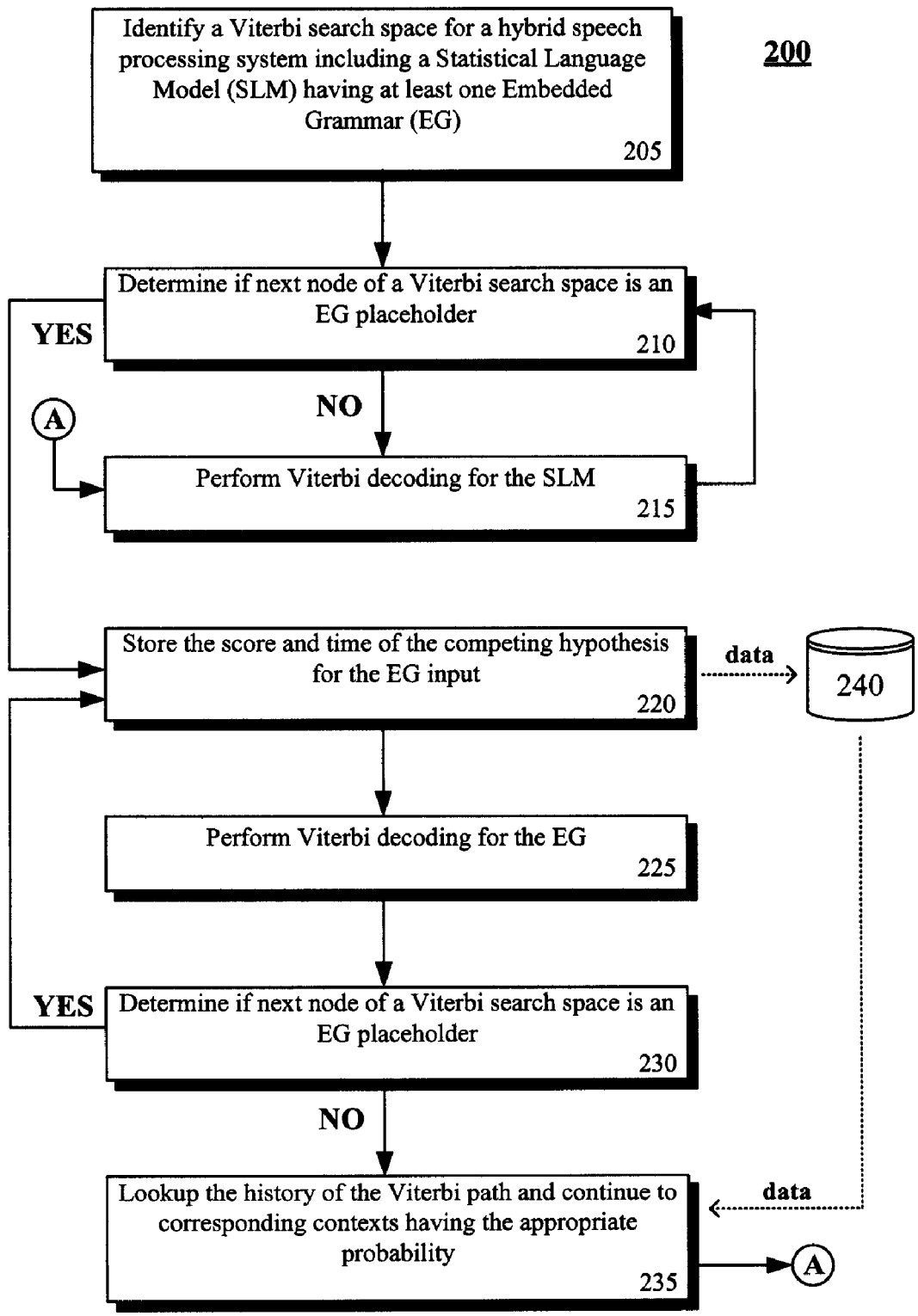
FIG. 2 is a flow chart of a method for efficiently handling embedded grammars within a language model in accordance with an embodiment of the inventive arrangements disclosed herein.

FIG. 2 is a flow chart of a method 200 for efficiently handling EGs within a language model in accordance with an embodiment of the inventive arrangements disclosed herein. Method 200 can be performed in the context of system 100.

The method 200 can begin in state 205, where a Viterbi search space can be identified. The search space can be one of a hybrid speech processing system that includes a SLM and at least one EG. In step 210, the method can determine whether the next node in the Viterbi search space is a grammar node, which is associated with an EG identifier or EG placeholder. If not, the method can proceed to step 215, where Viterbi decoding for a SLM node can be performed. The method can loop from step 215 to step 210, where standard Viterbi decoding can occur for SLM nodes, until a grammar node is detected.

When, in step 210, a grammar node is detected, the method can proceed to step 220, where decoding information, including an entry point and conditions at that entry point can be stored, such as in data store 240. The data stored can include, for example, a score and time of the competing hypothesis for the EG input. After storing data in store 240, the method can proceed to step 225, where Viterbi decoding can be performed for the EG. This decoding can use a RTN strategy. After the EG has been processed, a determination can be made as to whether the next node of the search space is a grammar node. If so, the method can loop back to step 220, where entry point and other conditions can be stored in data store 240 before branching to a sub network that handles the EG.

When the next node is not an EG placeholder, method 200 can progress from step 230 to step 235, where data can be fetched from data store 240. For example, the history of the Viterbi path can be looked up so that processing (HMM strategy processing) can continue at the point at which the exit (for RTN processing) was performed. Hence, step 215 can follow step 235, wherein in step 215 Viterbi decoding (HMM based) can be performed for the SLM.

Figure 3:
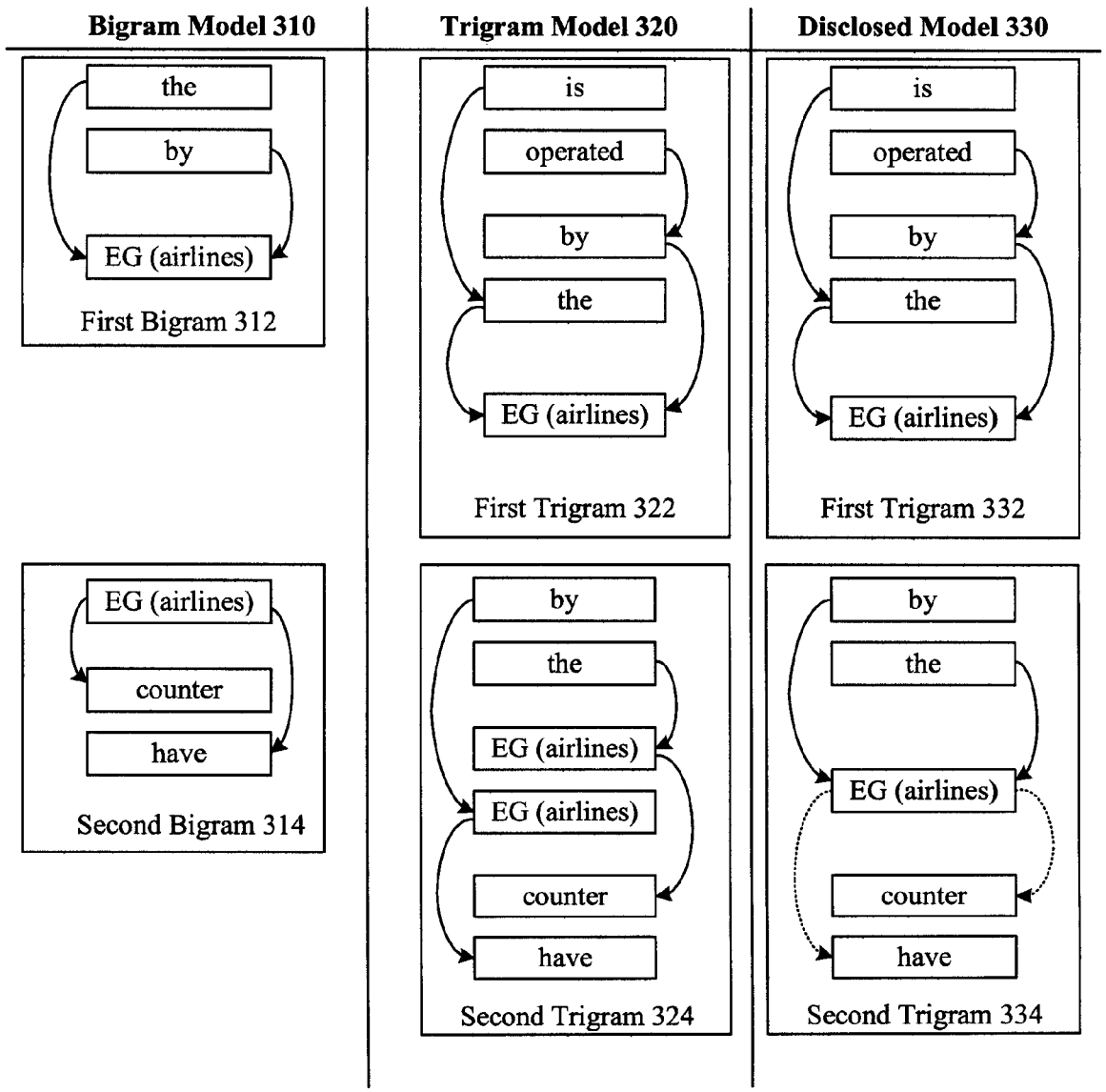
FIG. 3 is a chart illustrating how the disclosed solution reduces an amount of memory required for a Viterbi search to the size of a bigram model search space even though trigram searching is being conducted.

FIG. 3 is a chart illustrating how the disclosed solution reduces an amount of memory required for a Viterbi search to that of the size of a bigram model search space even though trigram searching is being conducted. FIG. 3 can be based on a simple airline example 305, which includes two contexts in which Airlines EG is used. The first context can include an illustrative phrase of "Where is the Japan Airlines counter." The second context can include a phrase of "All flights operated by Air France have been canceled."

Portions of these phrases have been used to create N-grams that include the EG. The first column of the chart is for a bigram model 310. The first bigram 312 illustrates that only one instance of the EG is needed. That is, EG is either proceeded by the word "the" for context one or by the word "by" for context two. The Second bigram begins with the EG and includes either the word "counter" for context one or the word "have" for context two. It is easy to see that bigram models 310 only require a single instance of the EG regardless of the number of contexts that the EG is used. Unfortunately, trigrams or higher are typically needed to achieve acceptable levels of speech recognition accuracy.

The second column of the chart is for a conventional trigram model 320. The first trigram 322 can include the EG as the third trigram element. There, only one instance of the trigram is needed because there is no potential for confusion when processing trigram 322 using a HMM strategy. In the second trigram 324, however, the EG is the second element. The preceding word (first element) before the EG limits what combinations are acceptable for the third element. For example, if the first element is the word "by", the only acceptable third element is the word "have" and not the word "counter." Using a conventional (unidirectional) HMM strategy, an instance of the EG is required for each context. Otherwise, invalid combinations would be permitted.

The third column of the chart is for the disclosed model 330 that uses trigrams, which have bigram memory requirements. The first trigram 332 includes the EG as the third element and is identical to the first trigram 322 of the trigram model 320. The second trigram 334, however, differs from the second trigram 324 of model 320 in that only one instance of the EG is needed. There, an entrance state from either the word "by" or "the" is stored along with a current probability for the trigram existing at that entrance point. This entrance point and associated scores are used as variables for computing the probability score for the EG, using an RTN sub network strategy.

Processing is then re-routed back to the entrance point, which is now the exit point for the RTN calculations, which returns processing to the proper path. So, if the entrance point was from a trigram 334 including the word "by," the exit point will resume with the word "have." Similarly, if the exit point was from a trigram 334 including the word "the," the exit point will resume with the word "counter." The probability score computed for the EG (using an RTN strategy) is treated like any other score computed for the trigram (using a HMM strategy). The lines connecting the second element of the trigram 334 and the third element of the trigram 334 are dotted to indicate that a non-conventional step is taking place.

It should be appreciated, that as contexts for an EG increase, a number of instances of the EG for trigram 324 increase. The instances of the EG needed for trigram 334, however, remain one. Further, as the N-gram increases to N>3, the number of EG instances needed under model 320 can continue to expand. Model 330, however, consistently only requires one instance of an EG regardless of the value of N (N=4, N=5, . . . ) and regardless of the number of contexts associated with the EG.

Figure 4:
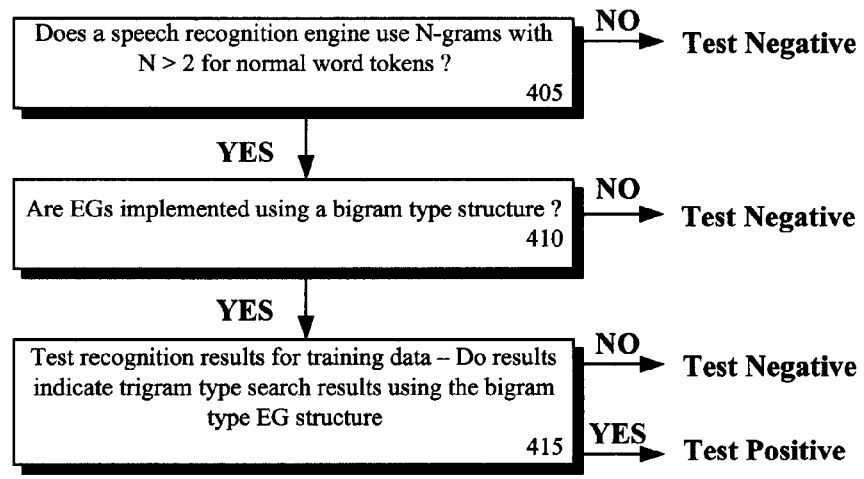
FIG. 4 is a schematic diagram indicating a means to detect whether a decoder is implementing the solution described herein.

FIG. 4 is a schematic diagram indicating a means to determine whether a decoder is implementing the solution described herein. The diagram is useful for both detecting infringement and for showing characteristics of a decoder, which incorporates inventive arrangements disclosed herein. The diagram can determine infringement using test cases, without requiring reverse engineering.

The solution can be tested using a three step (405-415) test. In step 405, the test can detect if a speech recognition engine is using N-grams with the N greater than two for normal word tokens. This can be performed by supplying more and more training data sentences. The resulting vocabulary image (e.g., ROM size) will linearly increase in size when bigrams are used. The vocabulary image will experience a polynomial growth, when N is greater than two.

In step 410, the test can detect whether EGs are implemented as bigrams or as N-grams with N greater than two. This can be determined by increasing an amount of content within embedded grammars and examining a size of a resulting vocabulary image. The size will linearly increase when EGs are implemented as bigrams. The vocabulary image will experience a polynomial growth, when N is greater than two.

In step 415, a third testing step can be performed when previous test steps indicate that an N-gram (N>2) probability is used for a bigram structure. Training data, such as data 420, can be established for the speech recognition engine. In data 420, wordA and wordB can have the same base form so that acoustic differences do not play any role in the test. The utterance sent to the recognizer can correspond to wordA wordY embedded_grammar1. As wordA and wordB have the same pronunciation, the output of the recognizer (e.g., decoded utterance) can be examined to ascertain whether trigram probabilities are used or not. In the data 420, embedded_grammar2 can contain words having very different acoustic properties from what is actually being said Embedded_grammar2 is used to obtain the necessary counts for testing purposes.

Probability calculation 425 shows a bigram probability calculation for the first sentence 426 and for the second sentence 428. As shown, the probability is better for the second sentence (wordB wordY embedded_grammar1).

Probability calculation 430 includes an extra term that boosts a probability of wordA wordY embedded_grammar 1. This extra term causes the probability to be better for the first sentence (wordA wordY embedded_grammar1). Because of the different results generated by calculations 425 and 430, and because of the determinations from steps 405 and 410, it can be easy to determine when an infringement of the present invention has likely occurred.

It should be understood that the test of diagram 400 can be modified to decrease false positive results and to prevent possible infringers from circumventing the test by imposing special case results designed to fool a particular test. Additionally, diagram 400 does not necessarily yield unambiguous results (it is possible that other novel approaches not yet utilized could yield somewhat similar results). The test can be used to quickly determine situations that merit further investigation.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

The invention may be embodied in other forms without departing from the spirit or essential attributes thereof. Accordingly, reference should be made to the following claims, rather than to the foregoing specification, as indicating the scope of the invention.

What is claimed is:

1. A speech processing method comprising:
generating, with at least one computer system, a search space from an N-gram language model with N greater than two, wherein the search space comprises a plurality of nodes including at least one grammar node that represents within the search space, an embedded grammar that is utilized in a plurality of contexts; and
associating a grammar identifier that is uniquely associated with the embedded grammar with the at least one grammar node, wherein the same grammar identifier is used for each of the plurality of contexts, said grammar identifier referencing a recursive transition network corresponding to the embedded grammar.

2. The method of claim 1, further comprising:
decoding speech based on the generated search space, wherein decoding speech comprises:
using a unidirectional decoding algorithm to determine probabilities for the plurality of nodes of the search space other than the at least one grammar node; and
when encountering a grammar node, determining an incoming probability for at least one node preceding the grammar node, calculating an outgoing probability for the grammar node using the recursive transition network referenced by the grammar identifier, returning to a point in the search space immediately following the grammar node, and continuing to decode speech using the unidirectional decoding algorithm for nodes subsequent to the grammar node that are not grammar nodes, wherein a probability used by the unidirectional decoding algorithm for a next node following the grammar node is the outgoing probability.

3. The method of claim 2, wherein the unidirectional decoding algorithm is used to find a most likely sequence of hidden states given an observed event, wherein said hidden states and said observed event are associated with nodes of the search space.

4. The method of claim 2, wherein the unidirectional decoding algorithm is a Viterbi algorithm.

5. The method of claim 1, wherein the embedded grammar is a context-free grammar.

6. The method of claim 1, wherein the embedded grammar is written in a grammar format specification language selected from a group of languages consisting of a BNF (Backus-Naur form), a Speech Recognition Grammar Speech (SRGS) compliant language, and a JAVA Speech Grammar Format (JSGF) compliant language.

7. The method of claim 1, wherein the embedded grammar is associated with a single sub network instance that is used for each of the plurality of contexts.

8. The method of claim 1, wherein the at least one grammar node comprises a plurality of grammar nodes for different embedded grammars, each grammar node being associated with a grammar specific recursive transition network.

9. The method of claim 1, wherein the N-gram language model is a trigram language model.

10. The method of claim 1, wherein said steps of claim 1 are steps performed by at least one machine in accordance with at least one computer program having a plurality of code sections that are executable by the at least one machine.

11. A speech recognition decoder comprising:
at least one processor programmed to:

generate a finite state machine search space from an N-gram language model with N greater than two, wherein the N-gram language model includes at least one embedded grammar, wherein said finite state machine search space includes statistical language model (SLM) nodes and grammar nodes, each grammar node representing a state associated with one of the at least one embedded grammar;

process the SLM nodes using a Hidden Markov Model (HMM) based strategy; and process the grammar nodes using a Recursive Transition Network (RTN) based strategy, wherein the finite state machine search space includes a single grammar node for each of the embedded grammars regardless of a number of contexts in which each of the embedded grammars is represented in the N-gram language model.

12. The speech recognition decoder of claim 11, wherein at least one embedded grammar is associated with a plurality of grammar nodes, wherein the at least one processor is further programmed to:

associate each of the plurality of grammar nodes for the embedded grammar with a grammar identifier that references a Recursive Transition Network (RTN) for the embedded grammar.

13. The speech recognition decoder of claim 11, wherein the at least one embedded grammar comprises a plurality of different embedded grammars, at least one of which is used in a plurality of contexts in the finite state machine search space.

14. The speech recognition decoder of claim 11, wherein the at least one processor uses a Viterbi based decoding algorithm to process the statistical language model (SLM) nodes.

15. The speech recognition decoder of claim 14, wherein the at least one processor is further programmed to:

calculate a plurality of Viterbi paths for a received speech utterance to determine a text segment having a highest probability; and output the determined text segment as a speech recognition result for the received speech utterance.

16. The speech recognition decoder of claim 15, wherein at least one of the plurality of Viterbi paths includes at least one grammar node.

17. The speech recognition decoder of claim 11, wherein the embedded grammar is written in a grammar format specification language selected from a group of languages consisting of a BNF (Backus-Naur form), a Speech Recognition Grammar Specification (SRGS) compliant language, and a JAVA Speech Grammar Format (JSGF) compliant language.

18. A method for semantically processing speech for speech recognition, the method comprising:

representing, with at least one computer system, an embedded grammar as a recursive transition network, wherein the embedded grammar is used in a plurality of contexts in an N-gram language model with N greater than two, wherein a single instance of the recursive transition network is used for the plurality of contexts.

* * * * *